Patented Oct. 27, 1925.

1,559,015

UNITED STATES PATENT OFFICE.

WINSTON F. STOODY, OF WHITTIER, CALIFORNIA.

WELDING ROD.

No Drawing.  Application filed July 9, 1925. Serial No. 42,584.

*To all whom it may concern:*

Be it known that I, WINSTON F. STOODY, a citizen of the United States, residing at Whittier, in the county of Los Angeles and State of California, have invented new and useful Improvements in Welding Rods, of which the following is a specification.

My invention relates to a welding rod used in processes wherein metal is fused by the electric arc or acetylene blow pipe and flowed into contact with heated solid metal for the purpose of welding, filing, coating or the like.

It is an object of this invention to provide a welding rod that will result in a deposit of metal which is self-hardening, that is to say, hard enough so that it cannot be filed, and stiff enough that it cannot be battered down.

It is a well known fact that when manganese is added to steel, the manganese content must be kept either below 2% or above 10%, 12 to 14% being the most desirable percentage. When manganese is added to steel in quantities of 5 and 6% the steel alloy produced is hard, but very brittle. Steel containing 12 to 14% of manganese resists abrasion, such for instance, as a sled runner would be subjected to by dragging the same over the ground, but such manganese steel alloy is not sufficiently stiff or dense for making the cutting edges of oil well tools or other tools, such as punches or shears. Such a manganese steel alloy does not show up hard on a Brinell test.

After many experiments I have discovered that when manganese is combined with chromium in certain proportions, a welding alloy is produced which is satisfactory both in hardness and in abrasion resisting qualities. The difficulty, however, in using manganese and chromium in combination is that the welding metal does not run easily through the electric arc or acetylene flame, owing to the fact that it appears to gasify freely, making the metal deposited very porous, full of blow holes and very difficult to control, due to its tendency to run away from the line of welding, so that it is nearly impossible to use a welding rod containing the proper proportions of manganese and chromium, as just stated, on any kind of work excepting flat work or horizontal work.

I have discovered that the addition of a small percentage of silicon prevents the welding alloy from gasifying and causes the welding alloy, when used by the electric arc, to penetrate the line of welding better, that it is much easier to handle in the welding operation and that the resulting deposited metal does not materially differ in strength, toughness or hardness from the allow containing manganese and chromium alone.

It is an object of this invention to make a welding rod having a combination of steel and alloy compounds which, when deposited by the welding operation, will result in a steel deposit having the abrasion resisting qualities of manganese steel and will also be hard enough to stand pounding and shocks and present a continuous cutting edge on tools.

My invention consists in the welding rod hereinafter described and claimed.

The welding rod is formed preferably of steel sheath or tube in which a steel rod is disposed forming a core, together with ferrochromium, ferromanganese, ferrosilicon and borax, preferably in the form of a powder, the latter being uniformly distributed within the sheath or tube. As a typical example I take 10.34% of 65. ferrochromium, 5.17% of 80. ferromanganese, 1.034% of 50. ferrosilicon, .258% of borax, and 83% of steel, the latter being in the shape of the sheath or tube and its core.

The ferromanganese, ferrochromium and ferrosilicon contains small quantities of carbon, and the ferromanganese and ferrochromium contain also small quantities of silicon, so that the welding rod thus assembled, when analyzed, for its total contents, gives the following results:

|  | Per cent. |
|---|---|
| Iron | 86.92 |
| Carbon content in the iron and alloys | .15 |
| Chromium | 6.72 |
| Manganese | 4.13 |
| Silicon | 1.27 |
| Carbon | .81 |
| Total | 100 |

The silicon 1.27% is the sum of the silicon derived from the ferrosilicon .52 and from the ferromanganese and ferrochromium .75, total 1.27%.

The chromium and manganese, as stated before, make an alloy with the steel having both the desired hardness and abrasion resisting qualities. The addition of the silicon causes the alloy to flow more easily, and prevents gasifying. The borax performs the well known function of a flux.

In acetylene welding, my improved welding rod will not emit any sparks, and differs in that respect from the common welding rods now in use.

The proportions of the ingredients may be changed within certain limits, but chromium should be used within the limits of 4 to 10%, manganese 2 to 8% and silicon ½ to 4%, of the total weight of the welding rod.

Various changes may be made in the arrangement of parts by those skilled in the art, without departing from the spirit of my invention, as claimed.

I claim:

1. A welding rod containing iron, chromium between 4 to 10%, manganese 2 to 8% and silicon ½ to 4%.

2. A welding rod containing iron, chromium approximately 7%, manganese 4% and silicon 1 and ¼%.

In testimony whereof I have signed my name to this specification.

WINSTON F. STOODY.